United States Patent [19]

Johnson et al.

[11] 4,337,805

[45] Jul. 6, 1982

[54] AGRICULTURAL BAG LOADING APPARATUS

[75] Inventors: William C. Johnson, Omaha; David H. Rasmussen, Arlington, both of Nebr.; Richard H. Lee, Astoria, Oreg.

[73] Assignee: AG-Bag Corporation, Arlington, Nebr.

[21] Appl. No.: 212,606

[22] Filed: Dec. 3, 1980

Related U.S. Application Data

[63] Continuation of Ser. No. 32,766, Apr. 24, 1979, abandoned.

[51] Int. Cl.³ .............................................. B65B 1/24
[52] U.S. Cl. ..................................... 141/71; 141/114; 141/231; 141/257; 141/314; 56/344
[58] Field of Search ................... 56/344, 341; 141/10, 141/67, 68, 100, 114, 256, 257, 311 R, 313–318, 377, 12, 69, 71–80, 231–233, 391, 392; 414/132; 17/33–42

[56] References Cited

U.S. PATENT DOCUMENTS

| | | |
|---|---|---|
| 173,966 | 2/1876 | Jones . |
| 1,588,681 | 6/1926 | Haney . |
| 1,911,535 | 5/1933 | Schultze . |
| 2,362,861 | 11/1944 | Russell . |
| 2,909,887 | 10/1959 | Claas . |
| 3,059,789 | 10/1962 | Bowles . |
| 3,252,277 | 5/1966 | Weichel . |
| 3,327,620 | 6/1967 | Cole . |
| 3,584,428 | 6/1971 | Falk . |
| 3,687,061 | 8/1972 | Eggenmüeller et al. . |
| 4,046,068 | 9/1977 | Eggenmüeller et al. . |
| 4,157,643 | 1/1979 | White . |

FOREIGN PATENT DOCUMENTS

2005218 8/1971 Fed. Rep. of Germany .
2151116 8/1978 Fed. Rep. of Germany .

*Primary Examiner*—Houston S. Bell, Jr.
*Attorney, Agent, or Firm*—Richards, Harris & Medlock

[57] ABSTRACT

In an agricultural bag loading apparatus (10), a primary shaft (52) has a plurality of teeth (46). Rotation of the primary shaft (52) causes the teeth (46) to force silage into an agricultural bag (12). Silage is fed toward the shaft (52) by the rotation of a feeder shaft (60) having a plurality of angle irons (62) mounted thereon. The brake force of a brake (110) is applied through a drum (20), a cable (18), and a backstop (16) to the end of the agricultural bag (12) to control the degree of silage compression within the bag.

35 Claims, 8 Drawing Figures

AGRICULTURAL BAG LOADING APPARATUS

CROSS REFERENCE TO RELATED APPLICATIONS

This is a continuation of application Ser. No. 032,766 filed Apr. 24, 1979, and now abandoned.

TECHNICAL FIELD

The present invention relates to farm machinery, and particularly relates to an agricultural bag loading apparatus for loading silage and the like into agricultural bags.

BACKGROUND ART

It is known to store agricultural products such as silage and the like in the field in large plastic bags referred to as agricultural bags. Such bags are generally designed to be filled from one end and may have a diameter in excess of eight feet and a length of up to one hundred feet or more.

Machines have been developed to load silage and other agricultural products into such agricultural bags. A known conventional agricultural bag loading apparatus includes a housing with a rotating shaft mounted therein. The shaft has a plurality of teeth extending outwardly therefrom which are arranged in a helical pattern about and along the shaft. As the shaft rotates, the teeth force silage into an agricultural bag which has been secured adjacent to the loading apparatus. As silage is loaded into the bag, the loading apparatus moves away from the filled end of the bag in a controlled manner. A stripping basket mounted in the housing encompasses the shaft for stripping silage from the teeth mounted on the shaft.

Although known agricultural bag loading apparatus has performed adequately, difficulties encountered in the operation and maintenance of such apparatus indicate a need for still further improvements in the art. For example, it is sometimes necessary to gain access to or remove the shaft of an agricultural bag loading apparatus, for example, to facilitate bearing maintenance or repair and to facilitate the repair or replacement of broken teeth. When the shaft is positioned within the stripping basket as is the case in certain prior agricultural bag loading apparatus, access to the shaft cannot be obtained without considerable difficulty. Likewise, the helical tooth arrangement of the prior agricultural bag loading apparatus is believed to cause difficulty in feeding silage and similar materials in certain instances.

SUMMARY OF THE INVENTION

The foregoing and other problems associated with conventional agricultural bag loading machines are solved by means of the present invention in which an agricultural bag loading apparatus for loading silage and the like into agricultural bags includes a housing defining an intake chamber for receiving silage and an output chamber adapted to fit within the mouth of an agricultural bag. A passageway is formed between the intake and output chambers, and the mouth of the agricultural bag is secured about the output chamber.

In accordance of the present invention, a feeder is mounted in the intake chamber of the housing for forcing silage in the intake chamber towards the passageway. The feeder may comprise a feeder shaft rotatably mounted in the intake chamber with a plurality of projections extending in a generally perpendicular direction from the feeder shaft. The feeder shaft is rotated and the projections urge silage in the intake chamber towards the passageway and the primary shaft.

A primary shaft is rotatably supported in the passageway, and a motor selectively rotates both the primary shaft and the feeder shaft. A plurality of teeth are mounted on the primary shaft in a non-helical, random pattern with the teeth being generally evenly distributed on the surface of the shaft. The teeth are adapted to force silage from the intake chamber through the passageway and into the output chamber when the shaft is rotated. A stripping comb is mounted on the housing and extends to within a predetermined distance from the shaft for removing silage from the teeth as the shaft rotates the teeth from the output chamber through the comb into the input chamber.

The teeth are operable when rotated to force silage from the intake chamber through the output chamber and into the agricultural bag. a backstop structure yieldably engages the end of the agricultural bag to resist the movement of the loading apparatus away from the filled end of the agricultural bag as silage is forced into the bag. Thus, a selected pressure is applied to the end of the agricultural bag so that the silage is loaded into the agricultural bag at a predetermined compression or pressure.

The backstop structure may comprise at least one drum rotatably mounted on the loading apparatus, and a brake mounted on the loading apparatus for braking or resisting the rotation of the drum with a selected brake force. A cable is wrapped around the drum in a single layer so that excessive wear of the cable is avoided. The cable is connected to a sheet of netting or other flexible material configured to conform to the shape of the end of the agricultural bag. The sheet of flexible material is operable to distribute the force of the cable over the area of the filled end of the agricultural bag to yieldably resist the movement of the loading apparatus away from the filled end of the bag as silage is received therein. In the preferred embodiment, the brake is a disc brake controlled by a manually operated pump with a pressure indicator and dial.

In accordance with one aspect of the present invention, the primary shaft is a steel pipe mounted in a pair of brass bushings that support both ends of the steel pipe. A driven sprocket is mounted to one end of the steel pipe, and a chain is connected between a drive sprocket and the driven sprocket. A hydraulic motor rotates the drive sprocket to rotate the primary shaft.

In accordance with another aspect of the invention, the teeth on the primary shaft are arranged in groups, and the teeth are curved away from the direction of travel to facilitate the removal of silage from the teeth as they pass through the comb. The comb includes a plurality of prongs extending downwardly from the housing to a predetermined position in the output chamber adjacent to the primary shaft so that the teeth are operable to force silage under the comb, and silage is removed from the teeth by the comb as the teeth pass therethrough. The prongs of the comb are curved with convex surfaces facing the output chamber of said housing to facilitate removal of silage from the teeth.

BRIEF DESCRIPTION OF THE DRAWINGS

The present invention may best be understood by reference to the following Detailed Description when considered in conjunction with the accompanying Drawings in which.

DETAILED DESCRIPTION

Figure 1:
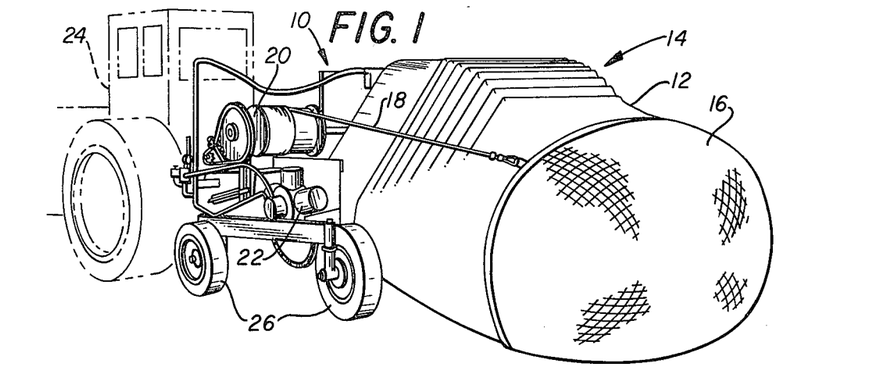
FIG. 1 is a perspective view of the agricultural bag loading apparatus of the present invention with an agricultural bag secured thereto and partially loaded.

Referring now to the drawings in which like reference characters designate like or corresponding parts throughout the several views, there is shown in FIG. 1 a perspective view of an agricultural bag loading apparatus 10 embodying the present invention. An agricultural bag 12 is shown mounted on the loading apparatus 10 and partially filled with silage. The agricultural bag 12 is gathered near the bag mouth 14 in an accordian-like fashion. As silage is fed into the agricultural bag 12, the loading apparatus 10 moves away from the filled end of the bag and the gathered portion of the bag expands to allow the bag to be filled.

A backstop 16 is positioned at the filled end of the agricultural bag 12. The backstop 16 is made of a suitable flexible material such as netting and conforms to the shape of the end of the agricultural bag 12. A pair of cables 18 (only one of which is shown in FIG. 1) extend between the backstop 16 and a pair of rotatable drums 20. As silage is forced into the agricultural bag 12, and the loading apparatus moves away from the filled end of the bag, cables 18 are pulled from the drums 20. The rotation of the drums 20 is resisted by a brake mechanism hereinafter described. Thus, the motion of the loading apparatus away from the filled end of the bag is yieldably resisted by the drums 20. The tension on the cables 18 is applied uniformly and evenly against the filled end of the agricultural bag 12 by the backstop 16. In this manner, the silage within the agricultural bag 12 is compressed at a pressure corresponding to the brake force on the drums 20.

The prime mover of the loading apparatus 10 is a hydraulic motor 22. The hydraulic motor 22 receives its power from a hydraulic pump driven by a tractor 24 which is shown in phantom. The loading apparatus 10 is mounted on four wheels 26 that may rotate through an angle of 90°. Thus, the loading apparatus 10 may be moved laterally for transport as well as forwardly and rearwardly for positioning and use.

Conventional means are used to secure the loading apparatus 10 to the tractor 24 for towing the loading apparatus 10 from place to place. As the agricultural bag 12 is filled with silage, the loading apparatus 10 is inched forward so that the bottom of the bag 12 remains stationary with respect to the ground. In some applications, it may be preferred to allow the loading apparatus 10 to remain stationary with respect to the ground while silage is loaded into the agricultural bag 12. In this latter case, the bottom of the agricultural bag 12 will be forced to slide along the ground or other support surface as it is filled.

Figure 2:
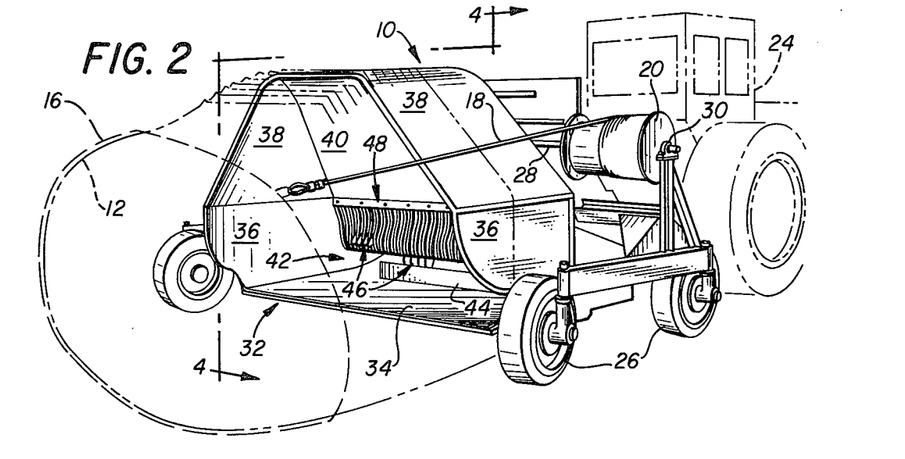
FIG. 2 is a view of the agricultural bag loading apparatus showing the output chamber thereof with an agricultural bag shown in phantom.

In FIG. 2, another side of the loading apparatus 10 is shown. In this view, the second drum 20 and cable 18 are shown. A shaft 28 interconnects the two drums 20 so that they must rotate in unison. The shaft 28 is rotatably supported by bearings 30.

The agricultural bag 12 and the backstop 16 are shown in phantom in FIG. 2 so that the output chamber 32 may be seen. The output chamber 32 is defined by a horizontal bottom 34 with two sidewalls 36 extending upwardly therefrom. The upper portion of the output chamber 32 is defined by two inclined sidewall sections 38 and a backwall 40 which abuts the inclined sidewall sections 38 and is inclined rearwardly from its base to its apex.

Silage is forced into the output chamber 32 through a passageway 42. An inclined shield 44 is mounted on the bottom surface 34 in the center of the passageway 42. Gaps are left on either side of the shield 44 and the sidewalls 36 so that silage is more easily forced through the passageway 42 along the sides of the output chamber 32 than in the center of the chamber 32. Silage is forced into the output chamber 32 by a plurality of teeth 46. As the teeth 46 pass out of the output chamber 32, a comb 48 strips silage from the teeth 46 retaining the silage in the output chamber.

Figures 3, 7:
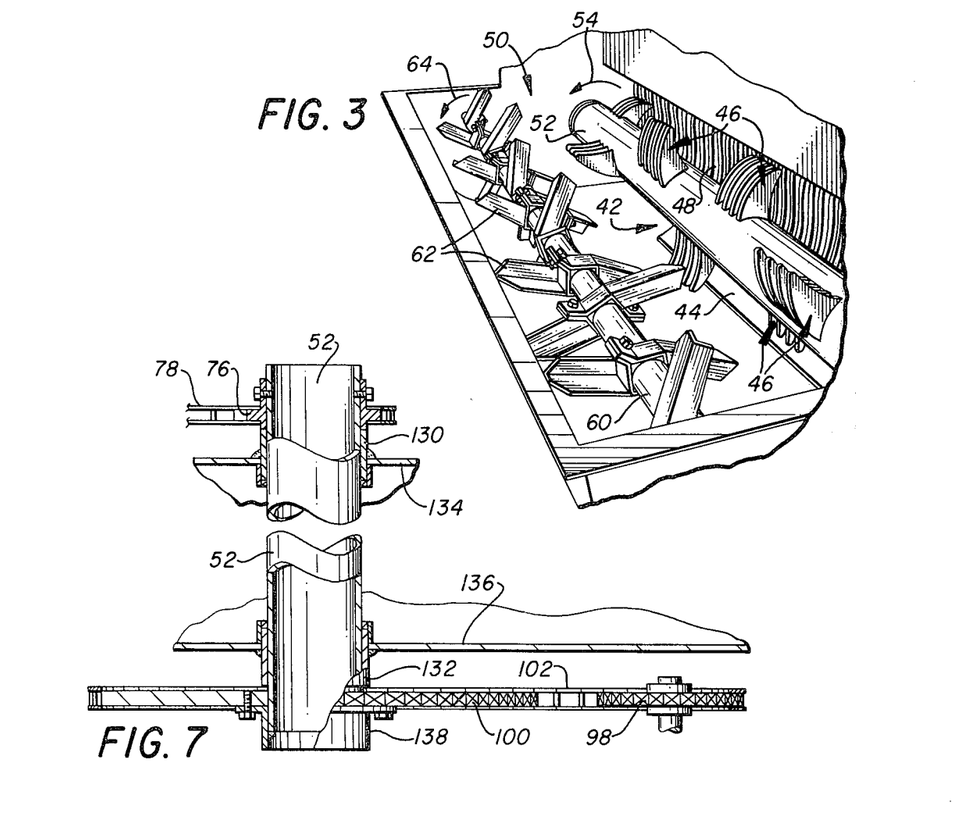
FIG. 3 shows the intake chamber of the loading apparatus and a feeder for forcing silage towards a passageway to the output chamber.
FIG. 7 is a cross sectional view taken through line 7—7 shown in FIG. 6 to illustrate the support structure for rotatably supporting the primary shaft.

Referring now to FIG. 3, there is shown a perspective view of the intake chamber 50 of the loading apparatus 10. The intake chamber 50 has an open top and one open side. Silage is fed into the intake chamber 50 from the top and is forced laterally out of the chamber. The passageway 42 extends between and connects the intake chamber 50 and the output chamber 32. A primary shaft 52 is rotatably mounted on the loading apparatus 10 and may be considered to be within the intake chamber 50. The primary shaft 52 is rotated in the direction indicated by arrow 54 in FIG. 3 so that the teeth 46 force silage in the intake chamber 50 under the primary shaft 52 through the passageway 42 and into the output chamber 32. As the teeth 46 return back into the intake chamber 50, the comb 48 strips the silage from the teeth 46.

A feeder shaft 60 is also mounted in the intake chamber 50 in a parallel relationship with the primary shaft 52. A plurality of feeder projections 62, which may comprise lengths of angle iron, are mounted on the shaft 60 and extend outwardly therefrom in a substantially perpendicular relationship to the shaft 60. As the shaft 60 is rotated in the direction indicated by the arrow 64, silage is forced under the shaft 60 and towards the shaft 52. In this manner, the feeder shaft 60 and the feeder projections 62 function to precompress the silage to a slight degree and insures that an adequate supply of silage is always presented to the teeth 46. Thus, the feeder insures the efficient operation of the loading apparatus 10 so long as an adequate amount of silage is fed into the input chamber 50.

Figure 4:
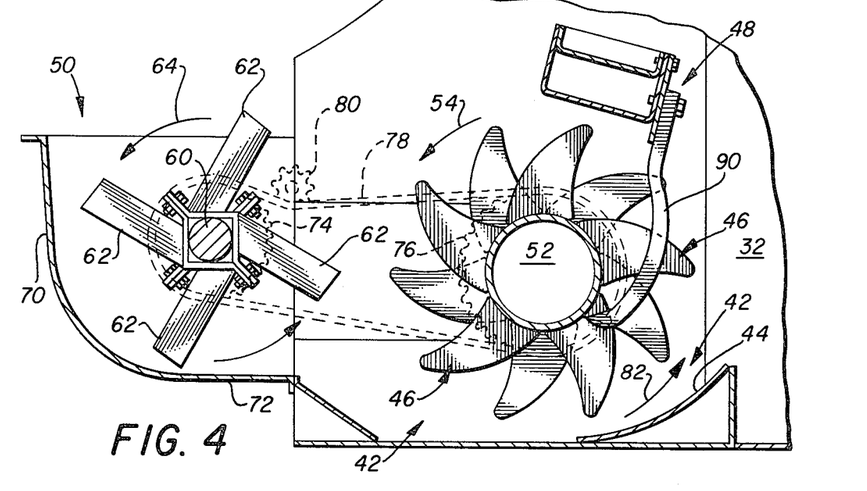
FIG. 4 is a cross sectional view of the loading apparatus taken through the plane 4—4 as shown in FIG. 2.

In FIG. 4, a cross-sectional view of the loading apparatus 10 is shown taken through the plane 4—4 of FIG. 2. Silage is fed into the top of the chamber 50 directly onto the rotating feeder projections 62. First, the silage is forced downwardly along the rear wall 70 of the intake chamber 50 by the projections 62. As the rear wall 70 extends downwardly, it curves inwardly and eventually forms the bottom surface 72 of the intake chamber 50. The silage follows the curvature of the rear wall 70 and is then forced along the bottom surface 72 towards the teeth 46. The momentum imparted to the silage by the rotating projections 62 carries it towards the teeth 46. Also, silage is forced towards the teeth 46 by following silage that was later placed in the intake chamber 50.

Sprockets 74 and 76 are mounted on the secondary shaft 60 and the primary shaft 52, respectively, and a chain 78 extends between the two sprockets so that the shaft 60 is rotated in response to the rotation of the shaft 52. The relative rotational velocities of the shafts 52 and 60 is controlled by the size of the sprockets 74 and 76. In the embodiment shown, sprocket 76 is slightly larger than sprocket 74 so that the shaft 60 will rotate at a greater rotational velocity than the shaft 52. A tensioning sprocket 80 is used to control the tension in the chain 78.

The teeth 46 on shaft 52 are rotated in the direction indicated by arrow 54 in FIG. 4 for engaging silage fed towards them by the feeder. The teeth 46 force the silage downwardly and, then, away from the intake chamber 50. In the approximate middle of the passageway 42, the teeth 46 force silage up the curved incline of shield 44, as indicated by arrow 82 in FIG. 4.

The comb 48 includs a plurality of prongs 90 that extend downwardly in the output chamber 32 to a predetermined position adjacent the shaft 52. The teeth 46 and the prongs 90 are alternately arranged so that each tooth 46 passes between a pair of prongs 90, and so that each prong is positioned between a pair of teeth. Each prong 90 is curved with the convex surface of the prong facing the output chamber. As the teeth 46 move in a circular motion about the shaft 52, the teeth gradually pass through the curved prongs 90 of the comb 48. In this manner, the prongs 90 strip silage and the like away from the teeth 46 after the silage has been forced into the output chamber 32.

It will be appreciated that the teeth 46 have a curved leading edge which is swept back away from the direction of travel of the teeth. This curvature enhances the ability of the comb 48 to strip silage from the teeth. Also, the curvature of the prongs 90 further enhance the ability of the comb 48 to strip silage from the teeth 46.

Figure 5:
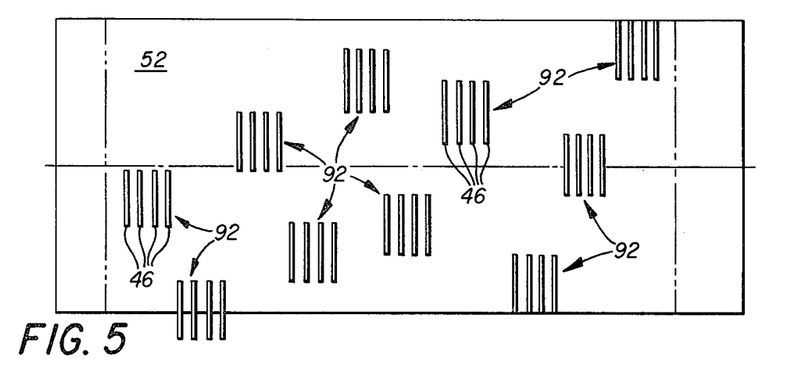
FIG. 5 is a development of the primary shaft showing the location of teeth on the shaft surface.

In FIG. 5, a development of the shaft 52 is shown to illustrate the placement of the teeth 46 thereon. In this development, the entire surface of the shaft 52 is shown flat as if the shaft 52 had been cut longitudinally and laid flat. The center line of FIG. 5 may be considered coincident with the axis of rotation of shaft 52. The teeth 46 are arranged in groups 92, with each group including either 3 or 4 teeth, in accordance with particular requirements. Within each group 92 the teeth 46 extend axially to the shaft 52.

The teeth 46 are distributed along the surface of the shaft 52 in a random pattern. The pattern is referred to as random because the tooth arrangement does not form any type of geometric pattern. However, the distribution of the teeth is generally even, albeit random, over the surface of the shaft 52. The even distribution of the teeth 46 on a shaft 52 insures that on the movement of silage by the teeth 46 will be approximately equal along the length of the shaft 52. The random pattern of distribution of the teeth 46 on the shaft 52 insures that different teeth will be in stress positions at different times. In the embodiment shown in FIG. 5, it will be noted that the leading edges of each tooth 46 of a particular group 92 does not coincide horizontally with the leading edge of any other group 92.

Figure 6:
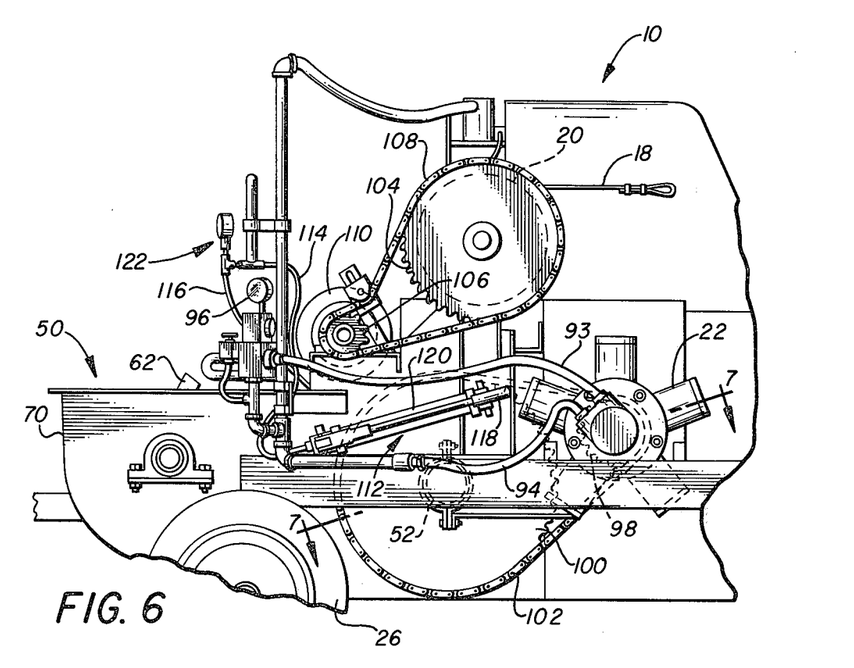
FIG. 6 is a side view of the loading apparatus showing drive and braking mechanisms.

Referring now to FIG. 6, there is shown a side view of the loading apparatus 10. In this view, the drive system of the loading apparatus 10 is clearly shown. The hydraulic motor 22 is interconnected by hydraulic lines 93 and 94 to a source of hydraulic power such as a hydraulic pump which may be driven by the power take-off of a tractor. A dial 96 is provided to measure the pressure of the hydraulic fluid going to the motor 22. A drive sprocket 98 is rotatably driven by the motor 22, and a driven sprocket 100 is secured to the shaft 52. A chain 102 mechanically connects the drive sprocket 98 to the driven sprocket 100 so that the motor 22 is operable to rotate the shaft 52 through the drive sprockets 98 and 100 and the chain 102.

It will be appreciated that a substantial mechanical advantage is achieved by using a relatively small drive sprocket 98 compared to the size of the driven sprocket 100. Thus, the rotational velocity of the motor 22 is greater than the rotational velocity of the shaft 52. Referring back to FIG. 4, it is shown that the primary shaft 52 also drives the feeder shaft 60. Thus, the hydraulic motor 22 drives both shafts 52 and 60.

In FIG. 6, it is shown that a sprocket 104 is mounted on the exterior end of the drum 20 and is interconnected with a sprocket 106 by a chain 108. The sprocket 106 is connected to a disc brake 110 which is used to resist the rotation of the drum 20. As the cable 18 is pulled outwardly, the drum 20 is rotated. The rotational force of the drum 20 is transmitted through the sprockets 104 and 106 and the chain 108 to the brake 110. Thus, the brake force of the brake 110 resists the rotational movement of the drum 20 and the outward movement of the cable 18.

The brake 110 is a conventional automobile disc brake and operates in a conventional manner. A manual pump 112 is interconnected through hydraulic line 114 and 116 with the brake 110 and is used to pressurize the brake. The pump 112 includes a pump handle 118 and a cylinder 120. As the handle 118 is pumped out and in with respect to the loading apparatus 10, the brake 110 is pressurized and a braking force is created. The brake force of the brake 110 is therefore proportional to the pressure created by the pump 112. A pressure sensor and dial 122 is connected between the hydraulic lines 114 and 116 to indicate the pressure being applied to the brake 110.

Referrig to FIGS. 1 and 6, it will be appreciated that the pressure indicated by the sensor and dial 122 is an indirect measurement of the brake force of brake 110. This brake force is directly proportional to the force required to pull the cable 18 from the drum 20. The force on the cable 18 is applied through the backstop 16 to the end of the agricultural bag 12 to determine the degree of compression of the silage or the pressure of the silage within the agricultural bag 12. Thus, the reading of the pressure sensor and dial 122 is an indirect measurement of the degree of compression of silage within the agricultural bag 12. By using the pump 112 to set the pressure on the brake 110, the operator may control the compression of the silage within the agricultural bag 12.

Referring now to FIG. 7, there is shown a cross sectional view taken through lines 7—7 of FIG. 6. In this view, the mounting of the primary shaft 52 is clearly shown with the middle portion of the shaft 52 being cut away so that only the two ends of the shaft are shown. The shaft 52 is preferably a steel pipe. The ends of the shaft 52 are supported by brass bushings 130 and 132 which are welded to the sidewalls 134 and 136 of the loading apparatus 10. The sprocket 76 is bolted to one end of the shaft 52 and abuts against the bushing 130 to hold the shaft 52 in position. On the other end of the shaft 52, a metal sleeve 138 is welded to the end of shaft 52 and is bolted to the sprocket 100. The sprocket 100 abuts the bushing 132 to hold the shaft 52 in position. The sprockets 76 and 100 prevent axial movement of the primary shaft 52 in either direction. This mounting structure is inexpensive, easy to manufacture, reliable and durable.

Figure 8:
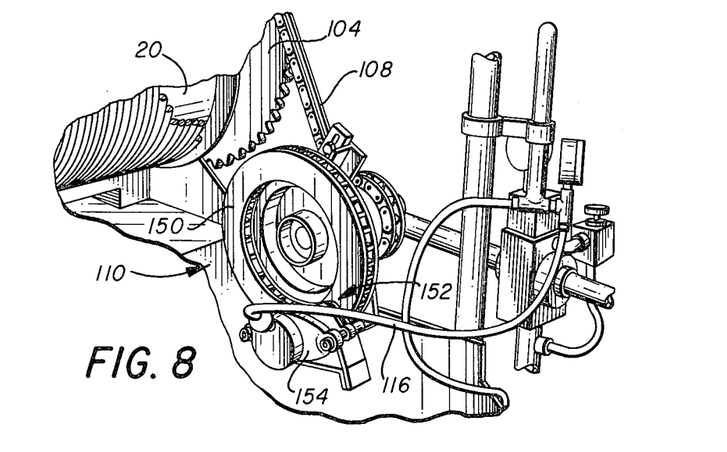
FIG. 8 is a detail view showing a disc brake for resisting the rotation of a drum.

Referring now to FIG. 8, there is shown a detailed view of the brake 110 used to control the rotational movement of the drum 20. As also shown in FIG. 6, a chain 108 connects the drum sprocket 104 to the brake 110. The brake 110 is a conventional disc brake including a disc 150 and disc pads 152. When pressure is applied to the brake mechanism 154 through the hydraulic line 116, the disc pads engage the disc 150 to apply a braking force through the chain 108 to the drum 20. As in a conventional brake system, the pressure applied through the hydraulic line 116 determines the brake force of the brake 110 and determines the degree of resistance to the rotational movement of the drum 20.

Although a particular embodiment has been described in the foregoing Detailed Description, it will be understood that the invention is capable of numerous rearrangements, modifications and substitutions of parts without departing from the spirit of the invention.

We claim:

1. An agricultural bag loading apparatus for loading material into agricultural bags, said apparatus comprising:
    a housing defining an intake chamber for receiving silage and an output chamber adapted to receive the mouth of an agricultural bag;
    means securing the mouth of an agricultural bag to said output chamber;
    a passageway formed between said intake chamber and said output chamber;
    a primary shaft;
    means for rotatably supporting said primary shaft in said passageway;
    drive means for selectively rotating said primary shaft;
    a plurality of teeth mounted along said primary shaft in a random pattern with said teeth being evenly distributed on the surface of said shaft, said teeth being adapted to force silage from the intake chamber through said passageway and into said output chamber when the shaft is rotated;
    a comb mounted on said housing and extending to within a predetermined distance from said shaft for removing silage from said teeth when the shaft is rotated;
    said teeth being operable when rotated to force silage from the intake chamber, through said passageway, through said output chamber and into the agricultural bag; and
    means for yieldably engaging the filled end of the agricultural bag to resist the movement of the loading apparatus away from the filled end of the bag as silage is forced into the agricultural bag so that silage is loaded into the bag at a predetermined pressure.

2. The loading apparatus of claim 1 further comprising a feeder mounted in said intake chamber of said housing for forcing silage in said intake chamber towards said passageway.

3. The loading apparatus of claim 1 further comprising:
    a feeder shaft rotatably mounted in the intake chamber of said housing;
    a plurality of projections extending in a generally perpendicular direction from said feeder shaft; and
    means for selectively rotating said feeder shaft so that said projections urge silage in said intake chamber towards said passageway.

4. The loading apparatus of claim 3 wherein said primary shaft and said feeder shaft are mounted in a parallel relationship and said feeder shaft is rotated so that said projections on the lower side of said feeder shaft are moving towards said primary shaft to force silage towards said passageway.

5. The loading apparatus of claim 4 further comprising:
    sprockets mounted on said primary and feeder shafts; and
    a chain connected between said sprockets so that said feeder shaft rotates in response to the rotation of said primary shaft.

6. The loading apparatus of claim 1 wherein said means for yieldably engaging the filled end of the bag comprises:
    at least one drum rotatably mounted on the loading apparatus;
    brake means for resisting the rotation of said drum with a selected brake force;
    a cable wrapped around said drum in a single layer to avoid excessive wear of said cable; and
    means for securing one end of said cable to the filled end to the end of the bag so that said cable is pulled off said drum against the brake force of said brake means as the agricultural bag is filled with silage.

7. The loading apparatus of claim 6 wherein said brake means comprises a disc brake operably connected to said drum for resisting the rotation thereof.

8. The loading apparatus of claim 7 further comprising:
    a drum sprocket mounted on said drum for rotation therewith;
    a brake sprocket mounted on said brake for rotation therewith; and
    a chain connecting said brake sprocket and said drum sprocket so that said brake rotates in response to rotation of said drum.

9. The loading apparatus of claim 6 wherein said brake means comprises:
    a disc brake mechanically connected to resist the rotation of said drum with a selected brake force; and
    a manually operated pump for pressurizing said disc brake, the brake force of said disc brake being proportional to the pressure of said manually operated pump.

10. The loading apparatus of claim 9 further comprising a pressure sensor and dial for indicating the pressure of said pump to indirectly indicate the degree of compression of the silage in the agricultural bag.

11. The loading apparatus of claim 1 wherein said means for rotatably supporting said primary shaft comprises:
  first and second bushings mounted in said housing for supporting the opposite ends of said primary shaft;
  a first sprocket mounted on one end of said primary shaft and mechanically connected to rotatably drive said primary shaft, said first sprocket abutting said first bushing to prevent axial movement of said primary shaft towards said second bushing; and
  a second sprocket mounted on the other end of said primary shaft and mechanically connected to output rotational drive from said primary shaft, said second sprocket abutting said second bushing to prevent axial movement of said primary shaft towards said first bushing, so that said first and second sprockets retain said primary shaft relative to said bushings.

12. The loading apparatus of claim 1 wherein said teeth extend outwardly from said primary shaft and are curved away from the direction of travel to facilitate the removal of silage from the teeth when said teeth pass through said comb.

13. The loading apparatus of claim 1 wherein the teeth are arranged in groups, wherein each group includes at least 3 teeth, and wherein the leading edges of the teeth of each group are nonaligned with those of any other group.

14. The loading apparatus of claim 1 wherein said comb comprises a plurality of prongs extending downwardly from said housing to a predetermined position in the output chamber and adjacent to the primary shaft so that said teeth force silage under the comb and silage is removed from said teeth by said comb as the teeth pass therethrough, said prongs being curved with convex surfaces facing the output chamber of said housing to facilitate removal of said silage.

15. In an agricultural bag loading apparatus for loading silage and the like into an agricultural bag including a housing having an intake for receiving silage and an output for discharging silage into an agricultural bag, and a silage moving device for forcing silage from the intake into the output and into the agricultural bag, the improvement comprising:
  a feeder mounted in the intake of the housing for forcing silage towards the output of said housing and comprising:
    a feeder shaft rotatably mounted in said intake;
    a plurality of projections extending from said feeder shaft in a generally perpendicular direction relative to said feeder shaft; and
    means for rotating the feeder shaft for moving said projections in a circular path to precompress the silage and to urge silage in the intake towards the output.

16. The improvement of claim 15 wherein said projections comprise angle irons attached to said feeder shaft.

17. In an agricultural bag loading apparatus having a primary shaft rotatably mounted therein in which silage and the like is forced into an agricultural bag by a plurality of teeth mounted along the primary shaft when the shaft is rotated, the improvement comprising:
  at least one drum rotatably mounted on the loading apparatus;
  brake means for resisting the rotation of said drum with a selected brake force;
  a cable wrapped around said drum in a single layer to prevent excessive wear of said cable; and
  means for securing the end of said cable to restrain the end of said bag so that the cable is pulled off the drum against the brake force of said brake means as the agricultural bag is filled with silage.

18. The improvement of claim 17 wherein said brake means comprises a disc brake operably connected to resist the rotation of said drum.

19. The improvement of claim 18 further comprising:
  a brake sprocket attached for rotation with said brake;
  a drum sprocket attached for rotation with said drum; and
  a chain connected between said brake sprocket and said drive sprocket so that said brake is operable to rotate in response to rotation of said drum.

20. The improvement of claim 17 wherein said brake means comprises:
  a disc brake mechanically connected to resist the rotation of said drum with a selected brake force; and
  a manually operated pump for pressurizing said disc brake, the brake force of said disc brake being proportional to the pressure of said pump.

21. The improvement of claim 20 further comprising a pressure sensor and dial for indicating the pressure of said pump to indirectly indicate the degree of compression of the silage within the agricultural bag.

22. The improvement of claim 17 wherein said means for securing comprises a backstop configured to conform to the shape of the end of the agricultural bag, said backstop being connected to said cable and being operable to distribute the force of said cable over the end of the agricultural bag to yieldably resist the movement of the agricultural bag.

23. An agricultural bag loading apparatus for loading silage and the like into an agricultural bag, said loading apparatus comprising:
  a housing defining an intake chamber for receiving silage and an output chamber adapted to receive the mouth of the agricultural bag;
  means securing the mouth of an agricultural bag to said output chamber;
  a passageway formed between said intake chamber and said output chamber;
  a shaft mounted in said passageway;
  a pair of bushings mounted in said housing for rotatably supporting the two ends of said shaft;
  a driven sprocket mounted on one end of said shaft for rotating said shaft;
  a drive sprocket;
  a drive chain connected between said drive sprocket and said driven sprocket;
  drive means for rotating said drive sprocket to rotate said driven sprocket and said shaft;
  the plurality of teeth mounted along said shaft for forcing silage from the intake chamber into said output chamber when said shaft is rotated;
  a comb mounted in said housing and extending to within a predetermined distance from said shaft for removing silage from said teeth as said teeth move from the output chamber into the intake chamber;
  feeder means mounted in the intake chamber for precompressing the silage and forcing the silage in the intake chamber toward said passageway;
  at least one drum rotatably mounted on said housing;
  brake means for resisting the rotation of said drum with a variable selected brake force;

a cable wrapped around said drum in a single layer for preventing excessive cable wear; and a backstop configured to conform to the filled end of the agricultural bag, said backstop being connected to said cable so that the brake force of said brake means is applied through said cable to said backstop for yieldably resisting the movement of the loading apparatus away from the filled end of said bag.

24. An agricultural bag loading apparatus for loading material into agricultural bags, said apparatus comprising:

a housing defining an intake chamber for receiving silage and an output chamber adapted to receive the mouth of an agricultural bag;

means securing the mouth of an agricultural bag to said output chamber;

a passageway formed between said intake chamber and said output chamber;

a primary shaft;

means for rotatably supporting said primary shaft in said passageway;

a driven sprocket mounted on one end of said primary shaft for rotating said primary shaft;

a drive sprocket mounted for rotation on the agricultural bag loading apparatus;

drive means for rotating said drive sprocket;

a drive chain connecting said sprockets so that said drive means is operable through said two sprockets and drive chain to rotatably drive said primary shaft;

a plurality of teeth mounted along said primary shaft with said teeth being evenly distributed on the surface of said primary shaft, said teeth being adapted to force silage from the intake chamber through said passageway and into said output chamber when said primary shaft is rotated;

a comb mounted on said housing and extending to within a predetermined distance from said primary shaft for removing silage from said teeth when said primary shaft is rotated;

said teeth being operable when rotated to force silage from the intake chamber, through said passageway, through said output chamber and into the agricultural bag; and means for yieldably engaging the filled end of the agricultural bag to resist the movement of the loading apparatus away from the filled end of the bag as silage is forced into the agricultural bag so that silage is loaded into the bag at a predetermined pressure.

25. The loading apparatus of claim 24 further comprising a feeder mounted in said intake chamber of said housing for forcing silage in said intake chamber towards said passageway.

26. The loading apparatus of claim 24 wherein said means for yieldably engaging the filled end of the bag comprises:

at least one drum rotatably mounted on the loading apparatus;

brake means for resisting the rotation of said drum with a selected brake force;

a cable wrapped around said drum; and means for securing one end of said cable to the filled end of the bag so that said cable is pulled off said drum against the brake force of said brake means as the agricultural bag is filled with silage.

27. The loading apparatus of claim 26 wherein said brake means comprises:

a brake mechanically connected to the loading apparatus to resist the rotation of said drum with a selected brake force; and a manually operated pump for pressurizing said brake, the brake force of said brake being proportional to the pressure of said manually operated pump.

28. The loading apparatus of claim 27 further comprising a pressure sensor and dial for indicating the pressure of said pump to indirectly indicate the degree of compression of the silage and the agricultural bag.

29. The loading apparatus of claim 24 wherein said driven sprocket is larger than said drive sprocket to provide a mechanical reduction so that said drive sprocket rotates at a substantially greater rotational velocity than said driven sprocket.

30. The loading apparatus of claim 24 wherein said teeth extend downwardly from said primary shaft and are curved away from the direction of travel to facilitate the removal of silage from the teeth when said teeth pass through said comb.

31. The loading apparatus of claim 24 wherein said comb comprises a plurality of prongs extending downwardly from said housing to a predetermined position in the output chamber and adjacent to the primary shaft so that said teeth force silage under the comb and silage is removed from said teeth by said comb as the teeth pass therethrough, said prongs being curved with convex surfaces facing the output chamber of said housing to facilitate removal of said silage.

32. In an agricultural bag loading apparatus having a primary shaft rotatably mounted therein in which silage and the like is forced into an agricultural bag by a plurality of teeth mounted along the primary shaft when the shaft is rotated, the improvement comprising:

at least one drum rotatably mounted on the loading apparatus;

brake means for resisting the rotation of said drum with a selected brake force, said brake means including a brake mechanically connected to the loading apparatus to resist the rotation of said drum and a manually operated pump for pressurizing said brake, the brake force of said brake being proportional to the pressure of said pump;

a cable wrapped around said drum; and means for securing the end of said cable to restrain the end of said bag so that the cable is pulled off the drum against the brake force of said brake means as the agricultural bag is filled with silage.

33. The improvement of claim 32 further comprising a pressure sensor and dial for indicating the pressure of said pump to indirectly indicate the degree of compression of the silage within the agricultural bag.

34. The improvement of claim 32 wherein said means for securing comprises a backstop configured to conform to the shape of the end of the agricultural bag, said backstop being connected to said cable and being operable to distribute the force of said cable over the end of the agricultural bag to yieldably resist the movement of the agricultural bag.

35. An agricultural bag loading apparatus for loading silage and the like into an agricultural bag, said loading apparatus comprising:

a housing defining an intake chamber for receiving silage and an output chamber adapted to receive the mouth of the agricultural bag;

means securing the mouth of an agricultural bag to said output chamber;

a passageway formed between said intake chamber and said output chamber;

a shaft mounted in said passageway for rotation;

a driven sprocket mounted on one end of said shaft for rotating said shaft;

a drive sprocket;

a drive chain connected between said drive sprocket and said driven sprocket;

drive means for rotating said drive sprocket to rotate said driven sprocket and said shaft;

a plurality of teeth mounted along said shaft for forcing silage from the intake chamber into said output chamber when said shaft is rotated;

a comb mounted in said housing and comprising a plurality of prongs extending downwardly from said housing to a predetermined position in the output chamber and adjacent to the shaft so that said teeth force silage under the comb and silage is removed from said teeth by said comb as the teeth pass therethrough, said prongs being curved with convex surfaces facing the output chamber of said housing to facilitate removal of said silage;

feeder means mounted in the intake chamber for forcing the silage in the intake chamber towards said passageway;

at least one drum rotatably mounted on said housing;

brake means for resisting the rotation of said drum with a variable selected brake force;

a cable wrapped around said drum; and a backstop configured to conform to the filled end of the agricultural bag, said backstop being connected to said cable so that the brake force of said brake means is applied through said cable to said backstop for a yieldably resisting the movement of the loading apparatus away from the filled end of said bag.

* * * * *

UNITED STATES PATENT AND TRADEMARK OFFICE
CERTIFICATE OF CORRECTION

PATENT NO. : 4,337,805
DATED : July 6, 1982
INVENTOR(S) : WILLIAM C. JOHNSON, ET AL.

It is certified that error appears in the above—identified patent and that said Letters Patent is hereby corrected as shown below:

Column 2, line 20, "bag. a" should be --bag. A--;
Column 5, line 28, "includs" should be --includes--;
column 5, line 57, after "axially", insert --relative--;
Column 8, line 40, "end to the end of" should be --end of--;
Column 12, line 20, "downwardly" should be --outwardly--.

Signed and Sealed this

Fifth Day of October 1982

[SEAL]

Attest:

GERALD J. MOSSINGHOFF

Attesting Officer    Commissioner of Patents and Trademarks

REEXAMINATION CERTIFICATE (773rd)
United States Patent [19]
Johnson et al.

[11] B1 4,337,805
[45] Certificate Issued  Oct. 20, 1987

[54] AGRICULTURAL BAG LOADING APPARATUS

[75] Inventors: William C. Johnson, Omaha; David H. Rasmussen, Arlington, both of Nebr.; Richard H. Lee, Astoria, Oreg.

[73] Assignee: AG-Bag Corporation, Arlington, Nebr.

Reexamination Request:
No. 90/000,707, Jan. 8, 1985
No. 90/000,997, Apr. 28, 1986

Reexamination Certificate for:
Patent No.: 4,337,805
Issued: Jul. 6, 1982
Appl. No.: 212,606
Filed: Dec. 3, 1980

Certificate of Correction issued Oct. 5, 1982.

Related U.S. Application Data

[63] Continuation of Ser. No. 32,766, Apr. 24, 1979, abandoned.

[51] Int. Cl.⁴ .............................................. B65B 1/24
[52] U.S. Cl. ......................................... 141/71; 53/576; 56/344; 100/65; 141/114; 141/231; 141/257; 141/314

[56] References Cited

U.S. PATENT DOCUMENTS

| | | | |
|---|---|---|---|
| 1,448,616 | 3/1923 | Dobson et al. | 100/67 |
| 3,108,658 | 10/1963 | Bassett | 188/72.3 |
| 3,687,061 | 8/1972 | Eggenmuller et al. | 100/65 |
| 3,849,043 | 11/1974 | Doering | 100/177 X |
| 3,888,170 | 6/1975 | Doering | 100/177 |
| 4,034,543 | 7/1977 | Voth et al. | 56/341 |
| 4,046,068 | 9/1977 | Eggenmuller et al. | 100/65 |

FOREIGN PATENT DOCUMENTS 2005218  8/1971  Fed. Rep. of Germany.
2151116  8/1978  Fed. Rep. of Germany.

OTHER PUBLICATIONS

*Standard Handbook of Mechanical Engineers*, Baumeister et al, 8th ed., sec. 10–9.
"Eberhardt Silopresse 401 Ersatzteilliste Spare Parts List", published Jun. 1975.

*Primary Examiner*—Mark John Thronson

[57] ABSTRACT

In an agricultural bag loading apparatus (10), a primary shaft (52) has a plurality of teeth (46). Rotation of the primary shaft (52) causes the teeth (46) to force silage into an agricultural bag (12). Silage is fed toward the shaft (52) by the rotation of a feeder shaft (60) having a plurality of angle irons (62) mounted thereon. The brake force of a brake (110) is applied through a drum (20), a cable (18), and a backstop (16) to the end of the agricultural bag (12) to control the degree of silage compression within the bag.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-16 and 32-35 is confirmed.

Claim 26 is cancelled.

Claims 17, 18, 20, 23-25 and 27 are determined to be patentable as amended.

Claims 19, 21, 22 and 28-31, dependent on an amended claim, are determined to be patentable.

17. In an agricultural bag loading apparatus having a primary shaft rotatably mounted therein in which silage and the like is forced into an agricultural bag *having a predetermined length* by a plurality of teeth mounted along the primary shaft when the shaft is rotated, the improvement comprising:
   at least one drum rotatably mounted on the loading apparatus;
   brake means for resisting the rotation of said drum with a selected brake force;
   a cable *having a working portion equal in length to the agricultural bag, said working portion being initially* wrapped around said drum in a single layer to prevent excessive wear of said cable; and
   means for securing the end of said cable to restrain the end of said bag so that the cable is pulled off the drum against the brake force of said brake means as the agricultural bag is filled with silage[.];
   *wherein said plurality of teeth are arranged in sets with the teeth of each set being substantially circumferentially spaced from the teeth of the next adjacent set such that the leading edge of each tooth in a set does not coincide horizontally with the leading edge of any tooth in the next adjacent set, whereby teeth of adjacent sets do not engage the silage sequentially.*

18. [The improvement of claim 17] *In an agricultural bag loading apparatus having a primary shaft rotatably mounted therein in which silage and the like is forced into an agricultural bag by a plurality of teeth mounted along the primary shaft when the shaft is rotated, the improvement comprising:*
   *at least one drum rotatably mounted on the loading apparatus;*
   *brake means for resisting the rotation of said drum with a selected brake force;*
   *a cable wrapped around said drum in a single layer to prevent excessive wear of said cable;*
   *means for securing the end of said cable to restrain the end of said bag so that the cable is pulled off the drum against the brake force of said brake means as the agricultural bag is filled with silage;*
   wherein said brake means comprises a disc brake operably connected to resist the rotation of said drum[.]; *and*
   *wherein said plurality of teeth are arranged in sets with the teeth of each set being substantially circumferentially spaced from the teeth of the next adjacent set such that the leading edge of each tooth in a set does not coincide horizontally with the leading edge of any tooth in the next adjacent set, whereby teeth of adjacent sets do not engage the silage sequentially.*

20. [The improvement of claim 17] *In an agricultural bag loading apparatus having a primary shaft rotatably mounted therein in which silage and the like is forced into an agricultural bag by a plurality of teeth mounted along the primary shaft when the shaft is rotated, the improvement comprising:*
   *at least one drum rotatably mounted on the loading apparatus;*
   *brake means for resisting the rotation of said drum with a selected brake force;*
   *a cable wrapped around said drum in a single layer to prevent excessive wear of said cable;*
   *means for securing the end of said cable to restrain the end of said bag so that the cable is pulled off the drum against the brake force of said brake means as the agricultural bag is filled with silage; and*
   wherein said brake means comprises:
   a disc brake mechanically connected to resist the rotation of said drum with a selected brake force; and
   a manually operated pump for pressurizing said disc brake, the brake force of said disc brake being proportional to the pressure of said pump.

23. An agricultural bag loading apparatus for loading silage and the like into an agricultural bag, said loading apparatus comprising:
   a housing defining an intake chamber for receiving silage and an output chamber adapted to receive the mouth of the agricultural bag;
   means securing the mouth of an agricultural bag to said output chamber;
   a passageway formed between said intake chamber and said output chamber;
   a shaft mounted in said passageway;
   a pair of bushings mounted in said housing for rotatably supporting the two ends of said shaft;
   a driven sprocket mounted on one end of said shaft for rotating said shaft;
   a drive sprocket;
   a drive chain connected between said drive sprocket and said driven sprocket;
   drive means for rotating said drive sprocket to rotate said driven sprocket and said shaft;
   the plurality of teeth mounted along said shaft for forcing silage from the intake chamber into said output chamber when said shaft is rotated;
   a comb mounted in said housing and extending to within a predetermined distance from said shaft for removing silage from said teeth as said teeth move from the output chamber into the intake chamber;
   feeder means mounted in the intake chamber for precompressing the silage and forcing the silage in the intake chamber toward said passageway;
   at least one drum rotatably mounted on said housing;
   brake means *mechanically connected to the loading apparatus* for resisting the rotation of said drum with a variable selected brake force;

a manually operated pump for pressurizing said brake means, the brake force of said brake means being proportional to the pressure of said manually operable pump;

a cable wrapped around said drum in a single layer for preventing excessive cable wear; and a backstop configured to conform to the filled end of the agricultural bag, said backstop being connected to said cable so that the brake force of said brake means is applied through said cable to said backstop for yieldably resisting the movement of the loading apparatus away from the filled end of said bag.

24. An agricultural bag loading apparatus for loading material into agricultural bags, said apparatus comprising:

a housing defining an intake chamber for receiving silage and an output chamber adapted to receive the mouth of an agricultural bag;

means securing the mouth of an agricultural bag to said output chamber;

a passageway formed between said intake chamber and said output chamber;

a primary shaft;

means for rotatably supporting said primary shaft in said passageway;

a driven sprocket mounted on one end of said primary shaft for rotating said primary shaft;

a drive sprocket mounted for rotation on the agricultural bag loading apparatus;

drive means for rotating said drive sprocket;

a drive chain connecting said sprockets so that said drive means is operable through said two sprockets and drive chain to rotatably drive said primary shaft;

a plurality of teeth mounted along said primary shaft with said teeth being evenly distributed on the surface of said primary shaft, said teeth being adapted to force silage from the intake chamber through said passageway and into said output chamber when said primary shaft is rotated;

*said teeth of the primary shaft being arranged in sets with the teeth of each set being substantially circumferentially spaced from the teeth of the next adjacent set so that teeth of adjacent sets do not engage the silage sequentially;* a comb mounted on said housing and extending to within a predetermined distance from said primary shaft for removing silage from said teeth when said primary shaft is rotated;

said teeth being operable when rotated to force silage from the intake chamber, through said passageway, through said output chamber and into the agricultural bag; and means for yieldably engaging the filled end of the agricultural bag to resist the movement of the loading apparatus away from the filled end of the bag as silage is forced into the agriculatural bag so that silage is loaded into the bag at a predetermined pressure.

25. The loading apparatus of claim 24 further comprising a feeder mounted in said intake chamber of said housing for forcing silage in said intake chamber towards said passageway, *said feeder comprising a feeder shaft rotatably mounted in said intake chamber, a plurality of projections extending from the feeder shaft and means for rotating the feeder shaft to move the projections in a circular path to precompress the silage.*

27. [The loading apparatus of claim 26] *An agricultural bag loading apparatus for loading material into agricultural bags, said apparatus comprising:* a housing defining an intake chamber for receiving silage and an output chamber adapted to receive the mouth of an agricultural bag;

means for securing the mouth of an agricultural bag to said output chamber;

a passageway formed between said intake chamber and said output chamber;

a primary shaft;

means for rotatably supporting said primary shaft in said passageway;

a driven sprocket mounted on one end of said primary shaft for rotating said primary shaft;

a drive sprocket mounted for rotation on the agricultural bag loading apparatus;

drive means for rotating said drive sprocket;

a drive chain connecting said sprockets so that said drive means is operable through said two sprockets and drive chain to rotatably drive said primary shaft;

a plurality of teeth mounted along said primary shaft with said teeth being evenly distributed on the surface of said primary shaft, said teeth being adapted to force silage from the intake chamber through said passageway and into said output chamber when said primary shaft is rotated;

a comb mounted on said housing and extending to within a predetermined distance from said primary shaft for removing silage from said teeth when said primary shaft is rotated;

said teeth being operable when rotated to force silage from the intake chamber, through said passageway, through said output chamber and into the agricultural bag;

means for yieldably engaging the filled end of the agricultural bag to resist the movement of the loading apparatus away from the filled end of the bag as silage is forced into the agricultural bag so that silage is loaded into the bag at a predetermined pressure;

*wherein said means for yieldably engaging the filled end of the bag comprises:*

*at least one drum rotatably mounted on the loading apparatus;*

*brake means for resisting the rotation of said drum with a selected brake force;*

*a cable wrapped around said drum; and*

*means for securing one end of said cable to the filled end of the bag so that said cable is pulled off said drum against the brake force of said brake means as the agricultural bag is filled with silage; and* wherein said brake means comprises:

a brake mechanically connected to the loading apparatus to resist the rotation of said drum with a selected brake force; and a manually operated pump for pressurizing said brake, the brake force of said brake being proportional to the pressure of said manually operated pump.

* * * * *